(12) United States Patent
Haverty

(10) Patent No.: US 6,189,096 B1
(45) Date of Patent: Feb. 13, 2001

(54) USER AUTHENTIFICATION USING A VIRTUAL PRIVATE KEY

(75) Inventor: Rand Haverty, Ottawa (CA)

(73) Assignee: Kyberpass Corporation, Nepean Ontario (CA)

( * ) Notice: Under 35 U.S.C. 154(b), the term of this patent shall be extended for 0 days.

(21) Appl. No.: 09/129,795

(22) Filed: Aug. 6, 1998

Related U.S. Application Data

(60) Provisional application No. 60/084,410, filed on May 6, 1998.

(51) Int. Cl.$^7$ .................................................. H04L 9/32
(52) U.S. Cl. .................. 713/155; 713/156; 713/170; 713/181; 713/183; 713/185; 713/178
(58) Field of Search ..................................... 713/155, 156, 713/175, 178, 154, 170, 181, 183, 185, 201; 709/229

(56) References Cited

U.S. PATENT DOCUMENTS

| | | | |
|---|---|---|---|
| 5,351,295 | * 9/1994 | Perlman et al. ...................... | 713/162 |
| 5,442,342 | * 8/1995 | Kung ................................. | 340/825.34 |
| 5,497,421 | 3/1996 | Kaufman et al. . | |
| 5,666,415 | * 9/1997 | Kaufman ............................. | 713/159 |
| 5,764,772 | * 6/1998 | Kaufman et al. ..................... | 380/30 |

FOREIGN PATENT DOCUMENTS

| | | |
|---|---|---|
| 0307627 | 3/1989 | (EP) . |
| 0661844 A2 | 12/1994 | (EP) . |
| 00807911 | 11/1997 | (EP) . |

* cited by examiner

*Primary Examiner*—Gilberto Barrón, Jr.
(74) *Attorney, Agent, or Firm*—Sughrue, Mion, Zinn, Macpeak & Seas, PLLC

(57) ABSTRACT

A method, computer system, and program product provides for authentication of user messages using PKI technology in environments where limited capacity prevents direct PKI technology use, and strong security is provided using magnetic swipe cards or the like, and a pass phrase is used for enhanced security and to avoid the need for special purpose devices. The invention is advantageous where there are limitations on the space available for PKI credentials, such as in the userid and password fields of a remote access protocol. PKI techniques are used without transferring lengthy keys or certificates once an initial registration process is complete. A secret key is used. A digest is computed of the secret key, the user's certificate serial number, and a time stamp. The digest, together with the user's certificate serial number and the time stamp, forms a compact message that may be transmitted. Private keys and secret keys are not sent during authentication. Replay attacks are prevented.

62 Claims, 11 Drawing Sheets

Fig. 3

| Certificate serial number | User name | Public Key |
|---|---|---|
| 1 | User A | A-pub |
| 2 | User B | B-pub |
| 3 | User C | C-pub |
| 4 | User D | D-pub |

300

USER AUTHENTIFICATION USING A VIRTUAL PRIVATE KEY

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application 60/084,410 filed on May 6, 1998; pursuant to 35 U.S.C. § 111(b). The Provisional Application 60/084,410 is incorporated by reference.

BACKGROUND OF THE INVENTION

1. Field of the Invention

This invention relates to a method for providing strong authentication of users within a Public Key Infrastructure (PKI).

In one preferred embodiment, the invention involves using a virtual private key. The invention also relates to a program product bearing software which enables user authentication with a virtual private key to be practiced on a computer system. The invention further relates to a computer system which operates so that user authentication is performed using a virtual private key.

In a second preferred embodiment, the invention involves a method for providing strong authentication of users within a PKI using a device such as a magnetic swipe card or a biometric device. The invention also relates to a program product bearing software which enables user authentication with a magnetic swipe card or the like to be practiced on a computer system. The invention further relates to a computer system which operates so that user authentication is performed using a magnetic swipe card or the like.

In a third preferred embodiment, the invention involves a method for providing strong authentication of users within a PKI using a pass phrase. The invention also relates to a program product bearing software which enables user authentication with a pass phrase to be practiced on a computer system. The invention further relates to a computer system which operates so that user authentication is is performed using a pass phrase.

2. Related Art

In PKI systems today, authentication of a user may be based on that user's knowledge of a private key. Private keys, however, are not something that a user can be expected to remember and to enter himself. It is often the case, therefore, that a user's private key is stored in encrypted from on the user's personal computer, and is accessed by the user with a password. This is a problem, however, because now it the password which becomes the weakest link in the security chain. Passwords that users can remember are notorious for being easy to determine by the clever intruder or hacker. If that password can be hacked by an intruder, then the otherwise strong security offered by the PKI is reduced to simple password-based security.

Thus, today's PKI systems may be said to have a weak link problem because of the private key being only password protected.

Another problem is that PKI is cannot readily be used in certain environments where storage is limited.

To explain, it should be noted that PKI systems use digital signatures to ensure the authenticity of the sender is of a message. Up to 2,000 bytes are required for digital signatures based on 1024-bit keys. However, in some situations, it is not practical or possible to directly use PKI technology, especially digital signatures, due to limitations in the environment.

One example of such an environment involves cards with magnetic strips. Devices such as credit cards and other magnetic swipe cards do not have the capacity to store 2,000 bytes. Thus, such devices cannot use digital ignatures.

Another example of a limiting environment exists in remote access systems. Here, the client station does not communicate directly with a security server. Instead, the client station communicates with a communications server, which, in turn, communicates with a remote access security server. The protocol used for communication between the client station and the communications server is typically designed to get a userid and password from the user. A typical example of such a protocol is the Point to Point Protocol (PPP). Such userid/password oriented protocols can pass about 60 bytes in their userid/password fields, which is insufficient to support for the direct use of public key technology for user authentication, encryption, or for digital signatures. Thus, PKI authentication cannot effectively be used in this type of remote access system.

To combat the weak link problem, there have been developed so-called "two-factor" techniques for improving the strength of the user authentication procedure. Here, authentication of the user is based on two factors:

something the user knows (e.g., a password), and something a user has (e.g., a smart card, a fingerprint, or the like). In a system operating according to a two factor technique, even if an intruder knows the password of a ser, the intruder will not be authenticated unless he satisfies the other factor (i.e., possesses the necessary smart card or fingerprint).

Two factor techniques provide very strong protection, and overcome the weak link problem of password protection, but are very disadvantageous. The disadvantage of a system using a two factor technique is the requirement for additional devices to perform user authentication. For example, a system using the two factor technique might employ a smart card as one of the two factors. This necessitates the presence of a card reader adapted to read the smart card. Likewise, relying on a user's fingerprint is as a factor requires a fingerprint scanner.

Such additional devices are not commonly included with computer systems today, and this is problematic for the user who needs to use a workstation that has no such additional device. Moreover, such additional devices may be costly.

Two-factor techniques provide for improved user authentication, and overcome the weak link problem of password protection, but they are nevertheless an undesirable solution.

What is needed is an improved approach to user authentication which overcomes the weak link problem of password protected private keys, but which also avoids the above-identified disadvantages of the two factor techniques.

Also, what is needed is a way to use PKI technology in environments where storage is limited.

SUMMARY OF THE INVENTION

This invention involves solving the above-identified problems using digests in a two step process of registration and authentication.

In one preferred embodiment, there is a method of user authentication using PKI technology in environments where limited capacity prevents direct PKI technology use. In a magnetic swipe card system, the data storage is the capacity that is limited. In a remote access (dial-up) system, the length of the userid/password fields is the capacity that is limited. The method according to the invention is most useful where there are limitations on the space available for PKI credentials.

According to this first embodiment of the invention, a novel dialog is used in such a way that PKI techniques can be used without actually transferring lengthy keys or certificates. The method of the invention also includes a technique for mapping a relatively short data field onto a full private key field.

In the case of applying the method of the invention to remote access environments, the invention modifies both the conventional registration and authentication processes normally used.

According to the invention, a virtual private key is used so that PKI can be used without passing actual PKI keys, certificates, or digital signatures.

In the main, the invention resides in a method, a computer system, and a computer program product providing for authentication of user messages using PKI technology in environments where limited capacity prevents direct PKI technology use. The invention is advantageous where there are limitations on the space available for PKI credentials, such as in the userid and password fields of a remote access protocol. PKI techniques are used without actually transferring lengthy keys, certificates, or digital signatures once an initial registration process is complete. A private key authenticates a user at a client and is used to retrieve a stored, encrypted secret key. A digest is computed of the secret key, the user's X.509 ISO standard public key certificate, and a time stamp. To further minimize the size of the message, the unique serial number of the user's certificate (the certificate serial number, also referred to as the certificate s/n) may be employed. The digest, together with the user's certificate serial number and the time stamp, forms a compact message that may be transmitted in the userid and password fields of a remote access protocol. The private key and the secret key are not sent. The secret key, stored beforehand at the server, is used along with the sent user's certificate serial number and the sent time stamp to compute another digest which is compared with the first digest. When the two digests match, the user is considered authentic. The time stamp is used to prevent replay attacks.

In a second embodiment of the invention, there is provided a way to use certain information referred to as a "reference" instead of a user's private key. Basically, the second embodiment differs from the first embodiment in that the user's private key is required during only the registration process. Thereafter, the user's private key is not used but, rather, a reference is read from something the user has, such as a magnetic swipe card or a biometric device. The reference is digested to provide a client secret key, and a preliminary digest is made of the user's certificate serial number, a time stamp, and this secret key. This preliminary digest is sent, along with the user's certificate serial number and the time stamp, to the authentication server. The authentication server may store the reference itself or may store a digested version of the reference. The digested reference serves as the server secret key. Upon receipt of the message, authentication is performed by digesting the time stamp and user certificate serial number and secret key, and comparing this computed digest with the preliminary digest sent in the message. This embodiment of the invention is advantageous in that the reference is not stored at the client. A hacker cannot obtain the reference by attacking the client station. Also, the user's private key is not used after registration. Moreover, when the user has a magnetic swipe card or the like, the user can very easily determine when the card is missing. Instead of a magnetic swipe card, the reference may be provided by a fingerprint reader, retinal scanner, or the like. In addition, the reference itself is sent only during the registration process, and thereafter is not per se sent over the network.

According to the third preferred embodiment of the invention, there is provided a passphrase which substitutes for the reference. In other words, the third embodiment is substantially similar to the second except that the user does not provide a "thing" such as a swipe card or a fingerprint. The user provides from memory a passphrase which serves as a reference. Like the reference, the pass phrase is not stored at the client and cannot therefore be discovered by hacker. As in the second embodiment, the user's private key is used during only the registration process, and the passphrase is not per se sent over the network afterward. Moreover, the third embodiment of the invention does not require any card reader or biometric device because the pass phrase may be entered using a keyboard.

The advantages and operations of the invention will become more clear in the light of the detailed description below taken in conjunction with the drawing figures.

BRIEF DESCRIPTION OF THE DRAWING FIGURES

FIG. 3 illustrates a public key look-up table.

DETAILED DESCRIPTION OF THE PREFERRED EMBODIMENTS

The presently preferred embodiments of the invention will now be described, first with respect to a remote access environment. Afterward, the invention will be described with respect to a magnetic swipe card environment. Then, the invention will be described with respect to a passphrase. The description of these three presently preferred embodiments includes numerous details. It is to be understood, however, that the present invention may be practiced without incorporating these specific configurations.

Embodiment of the Invention in a Remote Access Environment

In particular, the description of the invention in a remote access environment will begin with a description of some of the underlying principles of the invention, to wit, the security server approach to security, the use of public and private keys in a PKI system, and digital signatures.

Security is a serious problem on the Internet and other public networks today. An important aspect of network security is user authentication. User authentication includes the verification of the identity of a user at the initiation of a session or other activity, and also the prevention of unauthorized mimicry of an already-verified user.

To deal with security, the industry has adopted a security server approach. Under this approach, a security server is interposed between a client and an applications server. The role of the security server is to be the sole link between the client and the applications server. The security server establishes communications between the client and the applications server if and only if the user at the client is authenticated. The term "security server," as used in this sense, is meant to encompass security servers, proxy servers, firewalls, and authentication servers.

The Security Server Approach

Figure 1:
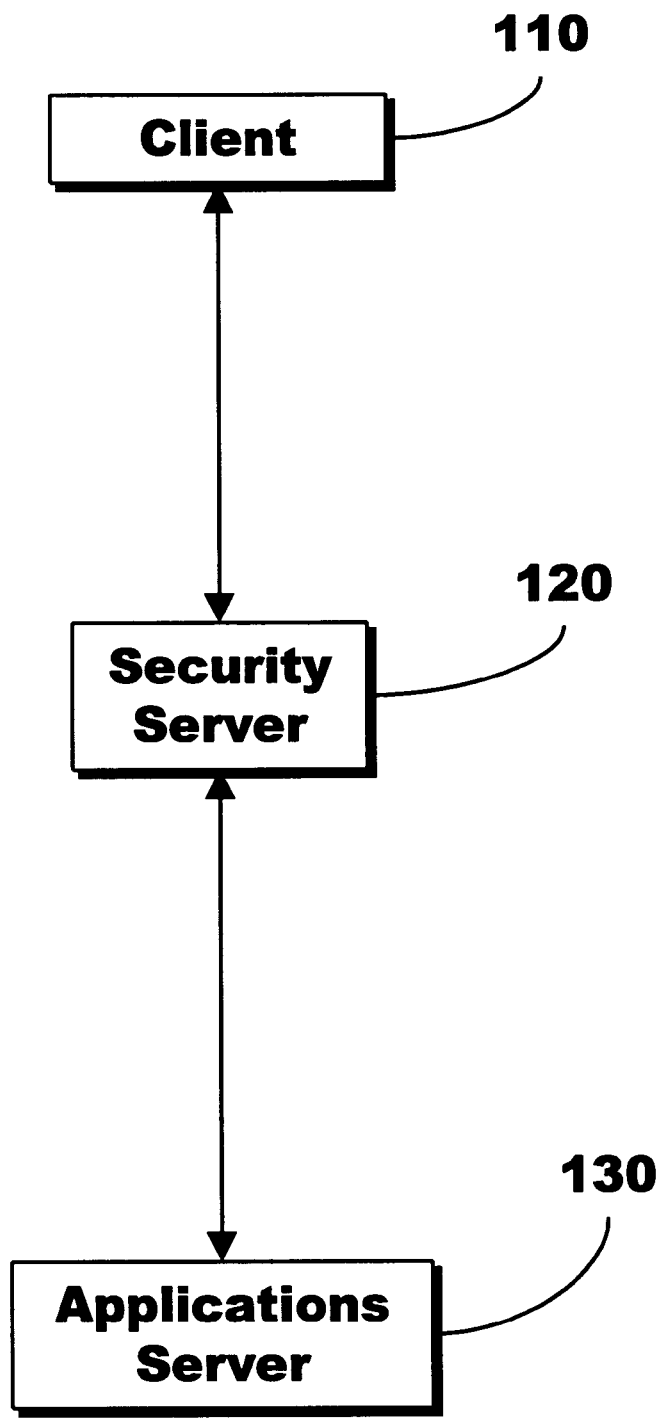
FIG. 1 illustrates a security server approach to network security.

The security server approach is illustrated, in very simplified form, in FIG. 1. In FIG. 1, reference numeral 10 indicates a client. A client may be understood to be a process that runs on a general purpose or specialized computer system. A client, as a process, may represent a user wishing to perform some operation with respect to an application on a network.

In FIG. 1, reference numeral 20 indicates a security server and reference numeral 30 indicates an applications server. There is no direct communication between the client 10 and the applications server 30. The security server 20 is interposed between client 10 and applications server 30. Security server 20 may be understood to be a process that runs on a general purpose or specialized computer system. Applications server 30 also may be understood to be a process in like manner.

More particularly, a user wishing to perform some operation with respect to a network uses client 10 as his interface to the network, and communicates via security server 20 with applications server 30. The operation desired by the user is to be performed by applications server 30. By interposing security server 20 as shown in FIG. 1, a certain measure of security is obtained. That is, users who are authorized to cause operations to be performed by applications server 30 are authenticated by security server 20, and are allowed to cause such operations. Users who are not so authorized are prevented by, security server 20, from passing commands to cause unauthorized operations to applications server 30.

It is typical that the computer systems, upon which run client 10, security server 20, and applications server 30 all run, are physically different computer systems separated by great distances. Although this arrangement is typical, the concept of the security server approach applies also even when the three foregoing processes are not running on physically different computer systems, or are not on computer systems separated by great distances. It will be appreciated, however, that the general context of this description relates to the typical arrangement just described.

The manner in which the computer systems communicate is treated herein at a high level, and the details are omitted for the sake of clarity. For more detailed information on such communications, reference may be made to *Data and Computer Communications* or to *Local Networks*, both by William Stallings, and both incorporated by reference in their entirety for their useful background information.

Processes (including client processes, security server processes, and applications server processes), on a practical level, are supplied as software on any one of a variety of media. Furthermore, the software actually is or is based on statements written in a programming language. Such programming language statements, when executed by a computer, cause the computer to act in accordance with the particular content of the statements, thereby causing the defined process to run in a predetermined manner. Furthermore, software may be provided in any number of forms including, but not limited to, original source code, assembly code, object code, machine language, compressed or encrypted versions of the foregoing, and any and all equivalents.

One knowledgeable in computer systems will appreciate that "media", or "computer-readable media", as used here, may include a diskette, a tape, a compact disc, an integrated circuit, a cartridge, a remote transmission via a communications circuit, or any other similar medium useable by computers. For example, to supply software that defines a process, the supplier might provide a diskette or might transmit the software in some form via satellite transmission, via a direct telephone link, or via the Internet.

Although such software instructions might be "written on" a diskette, "stored in" an integrated circuit, or "carried over" a communications circuit, it will be appreciated that, for the purposes of this discussion, the computer usable medium will be referred to as "bearing" the software. Thus, the term "bearing" is intended to encompass the above and all equivalent ways in which software may be associated with a computer usable medium.

For the sake of simplicity, therefore, the term "program product" is hereafter used to refer to a computer useable medium, as defined above, which bears software in any form.

FIG. 1 thus illustrates one typical arrangement to provide for security in a network of computer systems.

PKI Technology

To ensure the privacy of communications, there has been developed a system known as a Public Key Infrastructure (PKI). In a PKI system, each party or user has two cryptographic keys. The two cryptographic keys are a public key and a private key. The public key of a user is a key which is available to any other user. The private key of a user is never revealed to any other user. The use of private and public keys will now be discussed using a simplified example. For more detailed information concerning PKI systems, reference may be made to *Secure Electronic Commerce*, by Warwick Ford and Michael Baum, Prentice-Hall, ISBN 0-13-476342-4, which is hereby incorporated by reference in its entirety for its useful background information.

Figure 2:
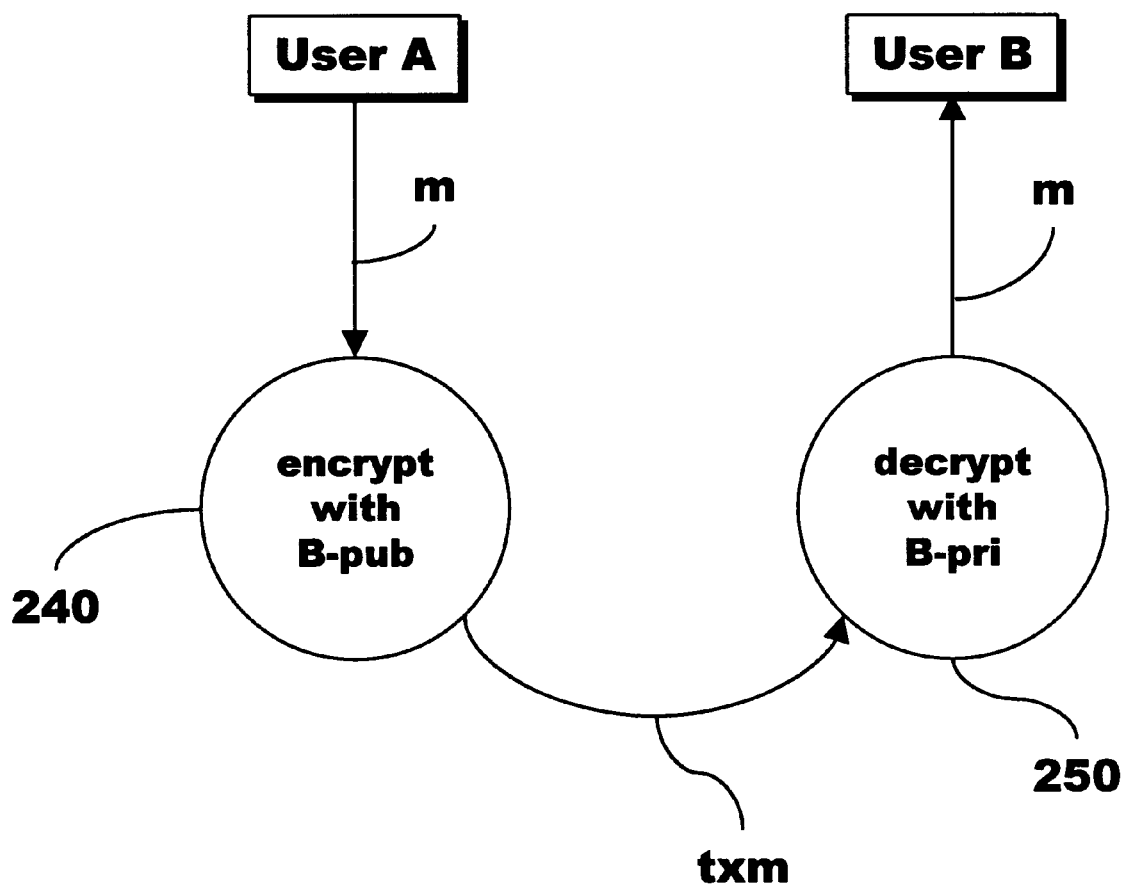
FIG. 2 illustrates the use of public and private keys in a PKI system.

FIG. 2 shows a sender, indicated by User A, and a receiver, indicated by User B. User A wishes to send a message m to user B under a PKI system. In this PKI system, User B has a public key B-pub and a private key B-pri.

FIG. 3 shows a table 300 which is available to the persons in the PKI system. It will be appreciated that, although the actual implementation of table 300 in a PKI system is not exactly that is illustrated in FIG. 3, the concepts are the same. Table 300 may be referred to as a public key look-up table. Public key look-up table 300 includes, for each user, information such as a certificate serial number, a user name, and a public key. The certificate serial number typically is a numeric identifier that uniquely identifies a particular user. The user name may be an alphanumeric for conveniently identifying a user's entry. The public key in this example is 1,024 bits in length.

Returning to FIG. 2, User A has a message m that is to be sent to User B. User A determines the public key B-pub of User B from public key look-up table 300. The unencrypted message m is encrypted by an encryption process 240 using the public key B-pub of User B. The encrypted message, suitable for transmission, is indicated by reference symbol txm. When User B receives txm, it decrypts txm with a decryption process 250. Decryption process 250 uses the private key B-pri of User B. The private key B-pri of User B is known only to User B. The output from decryption process 250 is the decrypted message m. The content of decrypted message m from decryption process 250 is the same as the content of unencrypted message m produced by User A, as long as the message has not been altered during transmission.

Encrypted message txm, which has been encrypted with B-pub, is completely unintelligible and can be decrypted only with B-pri. Thus, encrypted message txm may securely be sent over any communications network without fear of the message being read by an unauthorized recipient.

The existence of public key look-up table 300 is not completely essential to a PKI system. It may be imagined that, to establish secure communications, User A does not use public key look-up table 300 to determine B-pub but, rather, asks User B directly for B-pub. Since B-pub is the public key of User B, User B may freely provide B-pub.

Thus, it will be appreciated that, in a PKI system, a sender encrypts messages using the receiver's public key, and a receiver decrypts messages received using its own private key. It is important to note also that, if User B encrypts a message using B-pri, then the message can be decrypted only with B-pub.

Although User B may securely receive a message sent to it, and be assured that no unauthorized parties could have read and understood the encrypted message in transit, User B cannot be certain of the source of the message. A message that states it has been sent by User A might have been sent, instead, by User C masquerading as User A. Thus, User C (a thief) might send a message to User B (a bank) such as, "I am User A and I direct you to wire all the money from my account to User C." The message could be encrypted using B-pub, because this information is freely available. Although User B can decrypt the message, the mere fact of successful decryption does not mean the message came from User A.

Digital Signature

PKI systems provide for digital signatures to prove the identity of the sender of a message. That is to say, the sender of a message signs the message with a digital signature which proves that the message was sent by the sender and, moreover, that the message was not changed by another after the generation of the digital signature.

Figure 4:
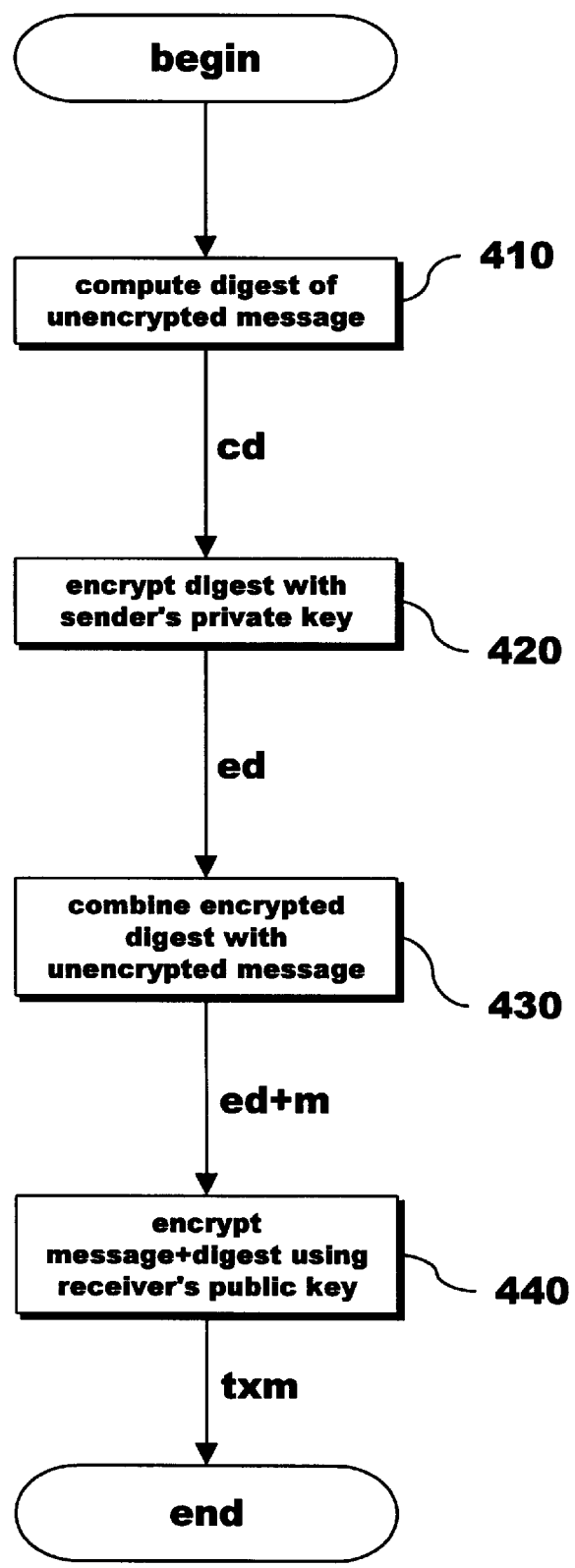
FIG. 4 illustrates how a digital signature may be included in a message.

FIG. 4 shows the high-level steps involved in generating a digital signature. In a first step 410, a digest is computed with respect to the message to be sent. This is understood by those who practice in this art but, for the sake of explanation, it will be noted that a digest is a numerical result similar to a hash function or checksum. The input to the digest computation step is the original message. The numerical result of applying the computation to the message may be referred to as a message digest. In FIG. 4, the output of step 410 is the computed digest, cd.

The computed digest cd is the input to step 420, in is which the digest itself is encrypted, using the private key of the sender, to provide encrypted digest ed. In step 430, encrypted digest ed is combined with the unencrypted message m. The result of combining ed and m is referred to as ed+m for convenience. In step 440, the combination of encrypted digest ed and message m is encrypted using the receiver's public key to provide an encrypted message txm. In this case, txm includes not only the original message but also the digital signature of the sender.

Figure 5:
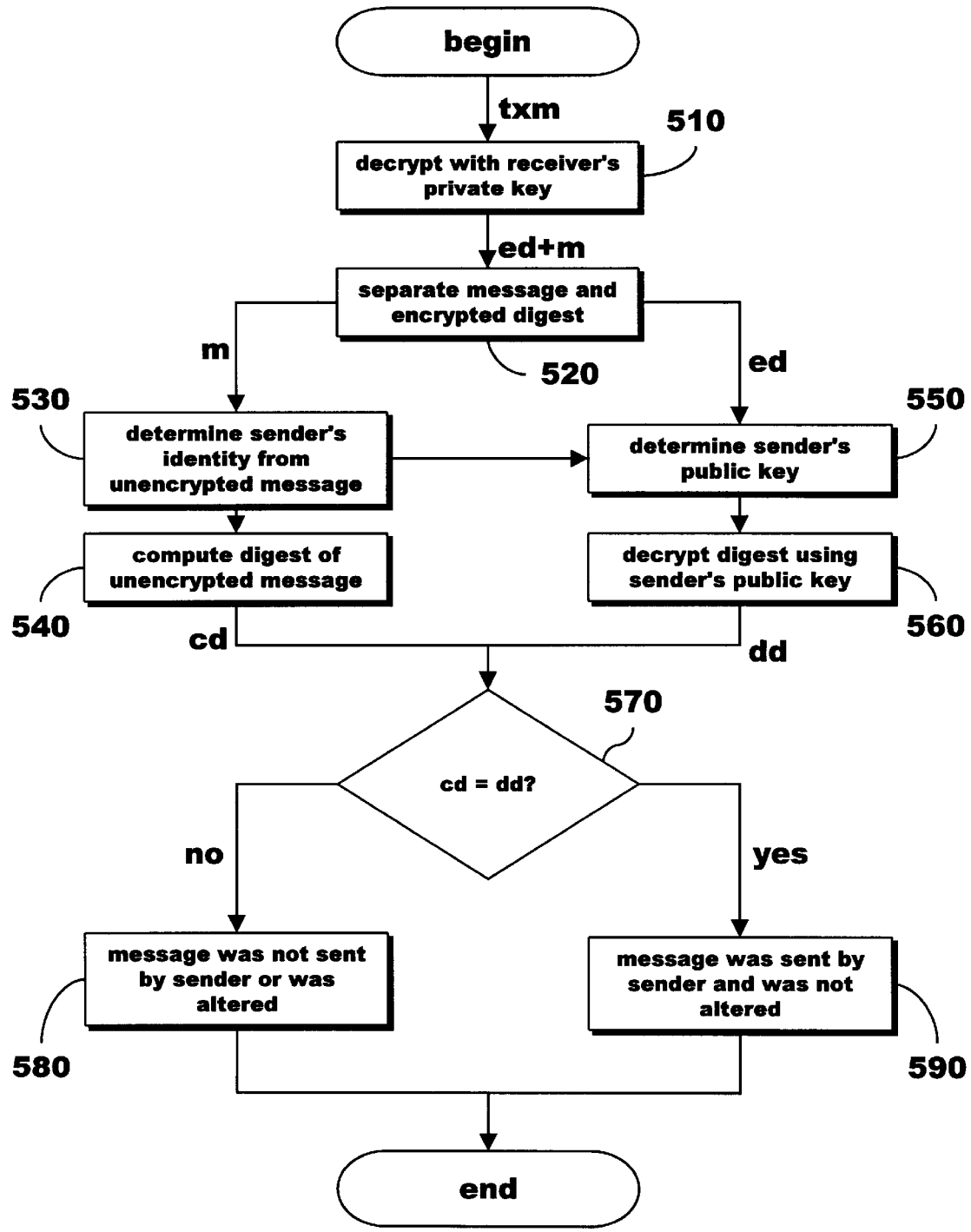
FIG. 5 illustrates how a digital signature included in a message may be verified.

FIG. 5 shows the high level steps in decrypting such a message. The incoming encrypted message txm is first decrypted using the private key of the receiver in step 510. The result is a combination of the unencrypted message m and the encrypted message digest ed (i.e., ed+m). These two are separated in step 520. In step 530, the unencrypted message m may be used to determine the supposed identity of the sender. This information may be used in step 550 as described below.

In step 540, the text of the unencrypted message m is used to compute a message digest; the result is a computed digest cd.

In step 550, the public key of the supposed sender is obtained. The identity of the supposed sender may be included in message m and determined in step 530. The identity is used, along with public key look-up table 300, to determine the public key to be used to decrypt ed. In step 560, the public key thus obtained is used to decrypt ed, thus providing a decrypted digest dd.

The computed digest cd, derived from the message m, is compared with the decrypted digest dd, derived from the digest computed by the sender. If cd and dd match, then it follows that the decryption of ed must have been successful, an occurrence which is possible only when the one who sent the message possessed the primary key of the sender (recall that the public key of the sender was used in the decryption of ed). It also follows that the message m could not have been altered, because the digest provided by the sender matches the digest computed by the receiver.

The sending of a message with its digest in the foregoing manner, or in a similar manner providing the same end result, may be referred to as the use of a digital signature.

Figure 6:
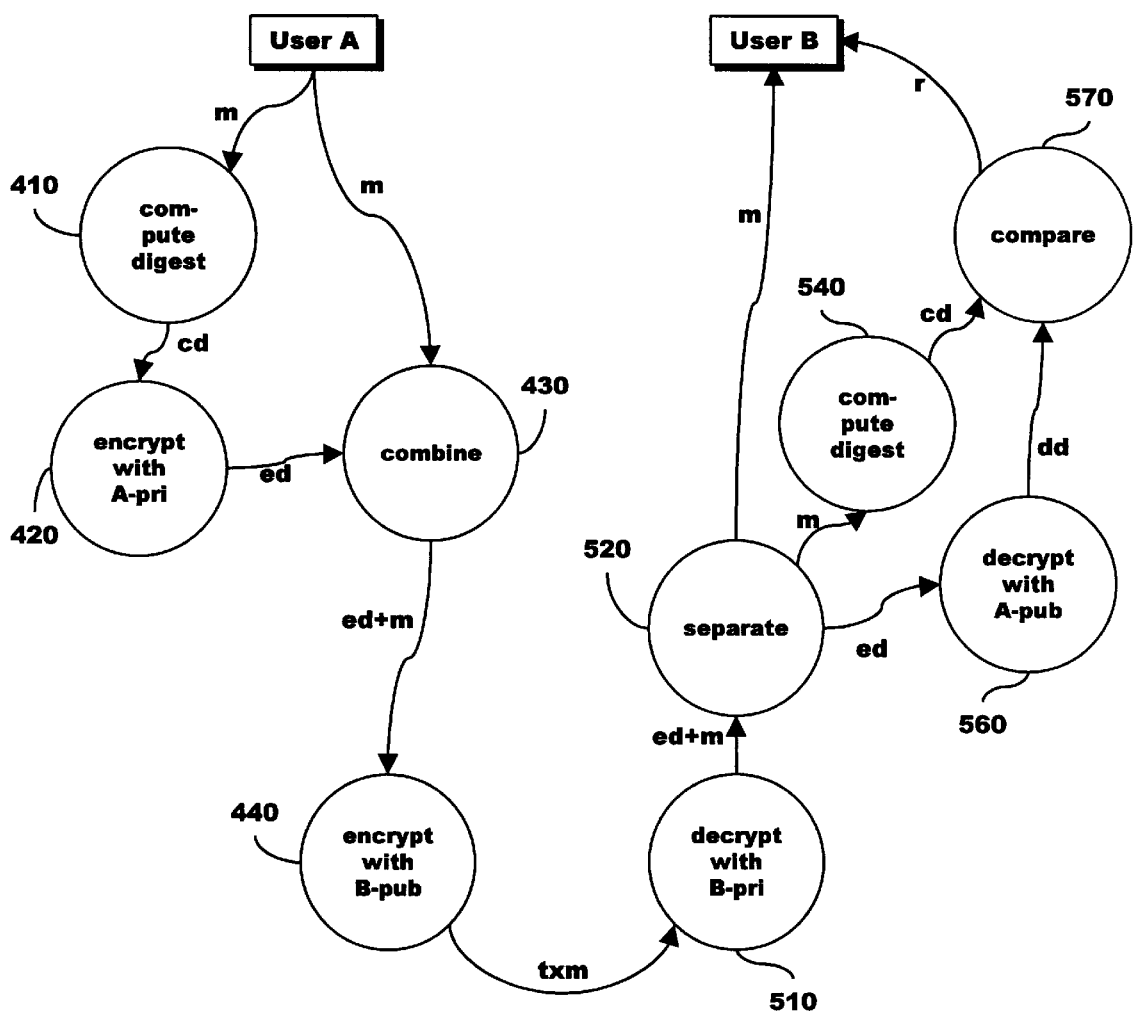
FIG. 6 illustrates the data flows involved in digital signature production and verification.

FIG. 6 illustrates the use of a digital signature between a sender, User A, and a receiver, User B. Like reference numerals and symbols are used for steps or items already explained. In FIG. 6, A-pri indicates the private key of User A. Some steps from FIGS. 4 and 5 have been omitted for clarity. The result of the comparison between cd and dd is shown as a result r.

The practice of using digital signatures is used to great advantage to provide guarantees of authenticity for the public keys contained in public key lookup tables.

Here, a trusted third party, often called the "certification authority," digitally signs each public key in the lookup table. To make these digital signatures universally understandable, the ISO X.509 standard for public key certificate formatting is used. This X.509 standard calls for the inclusion of the following "fields" in a certificate: (a) the certificate serial number; (b) the certificate's validity dates; (c) the name of the issuer of the certificate (i.e., the certification authority); (d) the name of the owner of the public key; (e) the owner's public key; (f) the digital signature of the certification authority on parts (a) through (e).

Thus, an X.509 certificate binds a user (or user name) to his public key with the certification authority's digital signature. This digital signature also makes it possible to verify that the data in the certificate has not been changed since it was signed (e.g., a user of the public key certificate should verify that the validity dates have not been changed). It is to be noted that the certification authority self-signs the public key of the authority and inserts this certificate into the lookup table so that all other certificate signatures can easily be verified with the public key in the certification authority certificate.

Certification authorities usually provide a certificate revocation list (CRL) certificate in the lookup table. This CRL is a list of the certificate serial numbers of certificates that have been disavowed. The list is signed and dated by the certification authority. Users of public keys from the lookup table can then check the CRL to ensure that the potential recipient of a message or sender of a digital signature is still in good standing.

Remote Access

A description of the preferred embodiment with respect to a remote access environment will now be discussed with more particularity with reference to FIG. 7.

Figure 7:
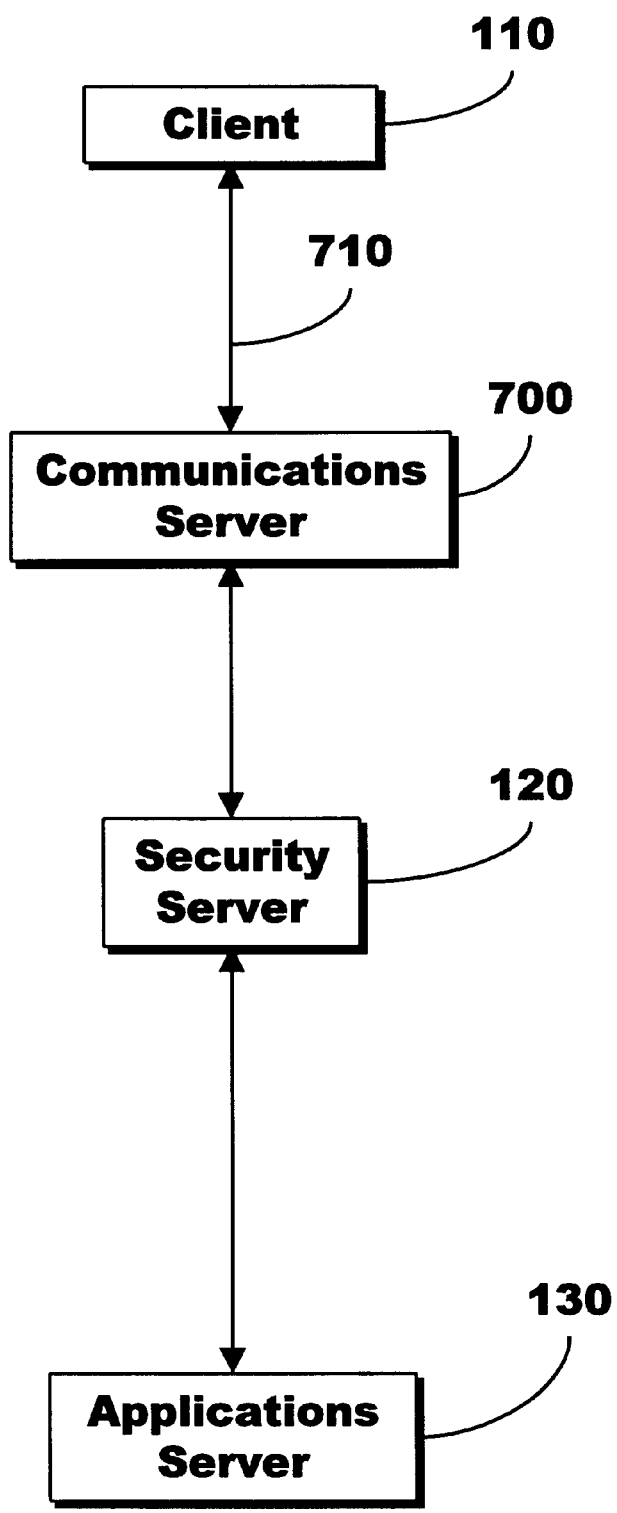
FIG. 7 illustrates a remote access environment.

In FIG. 7 client 110 communicates with security server 120 in a remote access, or dial-up manner. Because of this, client 110 requires a communications server 700 without which remote access is impossible. In normal operation, client 110 communicates with communications server 700 along a remote access link 710. This link may also be referred to as dial-up link 710. The communications protocol used on link 710 is a remote access protocol such as the Point to Point Protocol (PPP), which is well known in this field. The link between the communications server 700 and security server 120 may be another protocol, such as TACACS or RADIUS, which are also well known in this field.

The following documents are incorporated by reference in their entirety for useful background information concerning, respectively, TACACS and RADIUS:

Internet RFC 1492, "An Access Control Protocol, Sometimes called TACACS", July, 1993 (see http://leviathan.tamu.edu:70/ls/internet/rfcs); and Internet RFC 2138, "TXT Remote Authentication Dial in User Service (RADIUS), January, 1997 (see http://leviathan.tamu.edu:70/ls/internet/rfcs).

Registration

Figure 8:
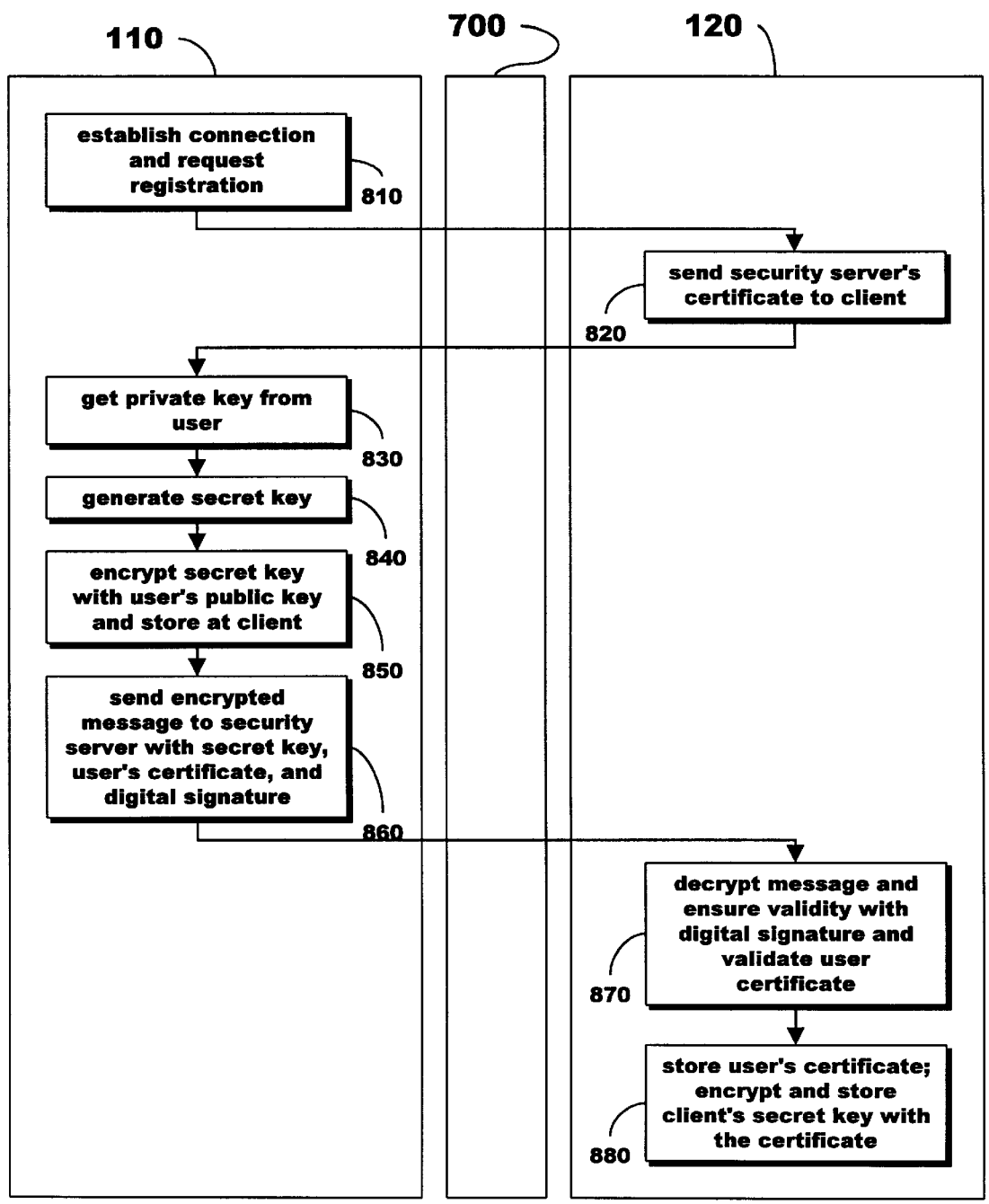
FIG. 8 illustrates a registration procedure for a Virtual Private Key (VPK).

The invention involves an authentication procedure which must be preceded by a registration procedure. The registration procedure will first be described with reference to FIG. 8, in which client 110, security server 120, and communications server 700 are shown.

First, a user, via client 110, requests of the communications server 700 a connection with security server 120. The communications server notifies the security server of this requested connection, and then solicits the user for his userid and password. Assuming that a valid userid and password are supplied at this point, the communications server establishes a connection between client 110 and security server 120. Once this connection is established, the client 110 and the security server 120 can communicate and send messages of arbitrary length and the communications server 700 is of no particular import. The foregoing actions are represented as step 810.

The security server 120, in step 820, then sends to the client 110 its certificate (see FIG. 3, public key look-up table 300). The certificate makes it easier for the client 110 to determine the public key of the security server 120 from public key look-up table 300.

In step 830, the user provides his private key to the client. The private key may be entered manually, using a magnetic swipe card, with a fingerprint scanner, a token, or the like. In step 840, the client generates a random, arbitrary secret key using PKI technology in a manner understood by those familiar with this field.

In step 850, the client encrypts the secret key just generated with the user's public key and stores the thus-encrypted secret key at the client. As is apparent, the thus-stored secret key can be decrypted only with the user's private key.

In step 860, a message is prepared for sending with a digital signature generated with the user's private key. The message includes the secret key generated in step 840 and the user's certificate. In terms of the drawing figures already explained (i.e., FIGS. 2, 4, 5, and 6), it may be assumed that these two items of information comprise message m, which has ed as the appended digital signature. Thus, txm, which has been encrypted with the security server's public key (obtained easily using the security server's certificate) is sent from client 110 to security server 120.

In step 870, the security server 120 decrypts txm using its own private key and obtains the message m having the secret key of the client and the certificate of the client, and also obtains the digital signature of the client ed which may be verified. Verification, as has been described, involves: decrypting ed to obtain dd; taking a message digest of m to obtain cd; and comparing cd with dd (see FIG. 5). From the server's point of view, the secret key may be thought of as a sent secret key since the secret key was sent to the server from a user. The user's certificate may be validated as already described above.

In step 880, the security server encrypts and stores the user's secret key along with the user's certificate for easy retrieval. To facilitate retrieval, these may be stored in a table which may be referred to as an authentication table.

The security server at this time may perform additional validation checks which shall be referred to in general as validating the user's certificate. In particular, the authenticity of the user may be checked by validating the user's name with the certificate's digital signature (e.g., item (f) in the X.509 certificate described above). Also, the server may access the CRL to ensure that the certificate of the user has not been revoked. As well, the server may ensure that the user's certificate is presently within the range of dates for which the certificate is valid (e.g., checking item (b) in the X.509 certificate described above). As used herein, therefore, to "validate user's certificate" means to perform one or more of the foregoing additional validation checks, or other similar checks.

The registration procedure need be performed only one time, but must precede the first operation requiring the authentication procedure to be performed. It will be understood that, in the preferred embodiment of the invention, a security server registers many users. As users (and also their respective secret keys) are registered, they may be thought of as being among a plurality of registered users. Their secret keys may be thought of as being among a plurality of registered keys.

It will also be appreciated that, although the secret keys are discussed as being stored "at" the server, this does not mean that the secret keys can be stored only on the internal hard drive of the security server, for example. On the contrary, the secret keys could be stored at any location accessible by the server and the invention would still work. Performance considerations, however, would urge the storage of the plurality of registered secret keys at a rapidly retrievable storage location. The same may be said of the information that was mentioned as being stored "at" the client.

The registration procedure having been described and illustrated, a description will now be provided of the authentication procedure.

Authentication

The authentication procedure is performed each time a user requests to open a session, via the communications server, and further via the security server, with the applications server.

Figure 9:
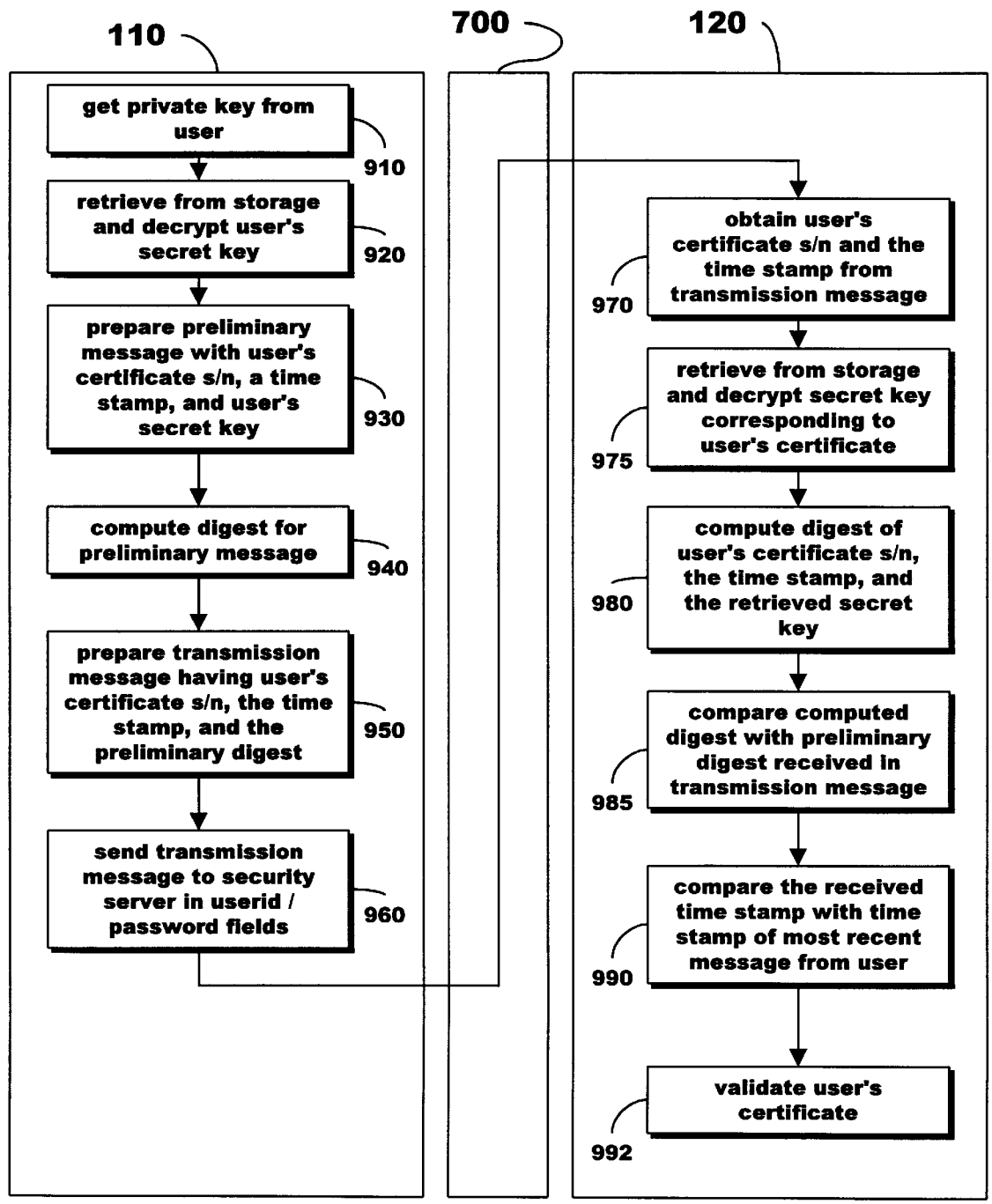
FIG. 9 illustrates an authentication procedure using a VPK.

In particular, with reference to FIG. 9, the user provides his private key to a client process 110 in step 910. The client retrieves the previously stored secret key and decrypts the secret key using the user's private key in a step 920.

In step 930, certain items of information are collected. The items are the user's certificate serial number, a current time stamp, and the user's secret key. These items, put one after another, may be thought of as a preliminary message for which a digest will later be computed in step 940. This preliminary message is never sent. The entire goal of collecting these items of information is to make it possible to produce the digest. Thus, calling this collection of information a preliminary message is for linguistic convenience only.

In step 940, a digest is computed for the preliminary message. The digest may be computed, e.g., using keyed MD5 or SHA1 algorithms, both of which are well known in PKI technology. It will be appreciated that the digest is very short and easily fits within the userid/password fields of remote access protocols. Since the digest is computed from the preliminary message, it may hereafter be referred to as a preliminary digest.

In step 950, a message is prepared which actually is transmitted (step 960). This message is here called a transmission message to differentiate it from the preliminary message which is not sent. The transmission message prepared in step 950 includes the user's certificate serial number, the time stamp that was used in making the preliminary digest, and the preliminary digest itself. These three items, even altogether, are still short enough to fit in the userid/password fields of the presently used remote access protocols such as PPP.

Not shown in FIG. 9 are the steps of the client contacting the communications server and requesting a connection with the security server; the communications server contacting the security server; and the communications server soliciting the user's userid and password from the client.

In step 960, the transmission message is placed in the userid and password fields and sent to the communications server which forwards the data from the fields to the security server. It is to be noted that the client does not provide a normal userid or password but, instead, inserts into these fields the above-identified transmission message prepared in step 950.

In step 970, the security server takes the transmission message data that was supplied in the userid and password fields and extracts its constituent parts, namely, the user's certificate serial number, the time stamp determined in step 930, and the preliminary digest computed by the client in step 940. In step 975, the security server uses the user's certificate serial number to retrieve from storage (i.e., from the authentication table) the corresponding user's certificate and encrypted secret key, and decrypts the secret key with its own private key. Although the term "retrieve" is used here, it is quite possible that the corresponding secret key already happens to be in RAM or the like. Thus, retrieve may simply mean moving the proper key information in to rapid is access registers as necessary. "Retrieve" should not be construed to be limited to an access of a disk.

In step 980, the security server computes a digest using the user's certificate serial number (provided in the transmission message), the time stamp (also provided in the transmission message), and the secret key (retrieved from the security server's own storage). In step 985, the security server compares the just-computed digest with the preliminary digest that was provided in the transmission message. The two digests can be equal only when the sender of the transmission message possesses the user's secret key. Since the user's secret key is encrypted with the user's public key prior to being stored at the client, this further implies that the sender possesses the user's private key.

In step 990, the security server compares the received time stamp with the time stamp of the most recent message from the user. This is done to avoid replay attacks. To explain, it should be noted that, when the user sends the transmission message in the userid/password fields to the security server, this message can be intercepted and recorded by unauthorized persons. Such an unauthorized person might very well replay such an intercepted message at a later time to attempt to convince the security server that the unauthorized person is the user. Such an attempt to breach security by replaying an intercepted message may be understood to be a replay attack.

The step 990 considers as invalid messages that do not have a time stamp that is later than the most recently received message. One way to express this is to say that a present message is received, and its time stamp is stored. Then, a subsequent message is received, and its time stamp is compared to the stored time stamp of the message that was, until receipt of the subsequent message, the present message. Here, it should be noted that t he term "stored" does not mean only storage to a location on a disk, for example. The essence of this term in this context is that the value of the previous message time stamp is remembered in some manner, whether written on disk, saved in RAM, or written into a register.

In other words, by virtue of step 990, each transmission message is valid only one time. The storage of the most recent time stamp for each user (for example, in the authentication table) thus provides security against replay attacks. Furthermore, when an unauthorized person edits the userid and password fields to insert a new time stamp where the old time stamp was, this causes a mismatch between the digest computed by the security server and the preliminary digest sent in the transmission message. In addition, since the unauthorized person does not know the secret key of the user, the preliminary digest cannot be replicated for differing time stamps.

In step 992, the user's certificate may be validated by the security server 120 as already described above. It should be noted that this step need not be performed at only this point but, rather, might be appropriate prior to step 980 so as to avoid undertaking the computation of the computed digest when the user's certificate is invalid.

The secret key is passed only once, in encrypted form, from the client to the security server. This occurs during the registration procedure. The secret key is used, however, every time the authentication procedure is carried out. It is needed at the client and at the security server. Thus, the secret key may be referred to as a Virtual Private Key (VPK) because it is used so frequently but never actually passed during the authentication process.

The foregoing registration procedure and authentication procedures amount to a method which allows full public key benefits without the actual transmission of the relatively long PKI credentials. Because the transmission message with its preliminary digest is quite short, it can be sent in short data fields. It may be said that the above-identified invention provides a way to map relatively long PKI information onto short data fields.

The invention is not limited, however, to remote access environments. It is equally applicable to providing security for any type of environment in which space precludes the passing of the relatively long PKI information.

Embodiment of the Invention in a Magnetic Card Environment

Another presently preferred embodiment involves the use of industry standard magnetic stripe cards, also known as swipe cards. Such cards have limited storage space. Analytically, the problem of small storage on such a card may be seen as substantially similar to the problem of small userid/password fields in a protocol. Both problems involve the need for security, and the concomitant need to pass more data than will fit, and both are amenable to the VPK approach of the invention.

Many aspects of the invention with respect to the embodiment in a magnetic card environment are substantially similar to corresponding aspects of the invention as described, above, with respect to the remote access environment. For the sake of simplicity and clarity, such aspects will not again be discussed in detail.

Registration

Figure 10:
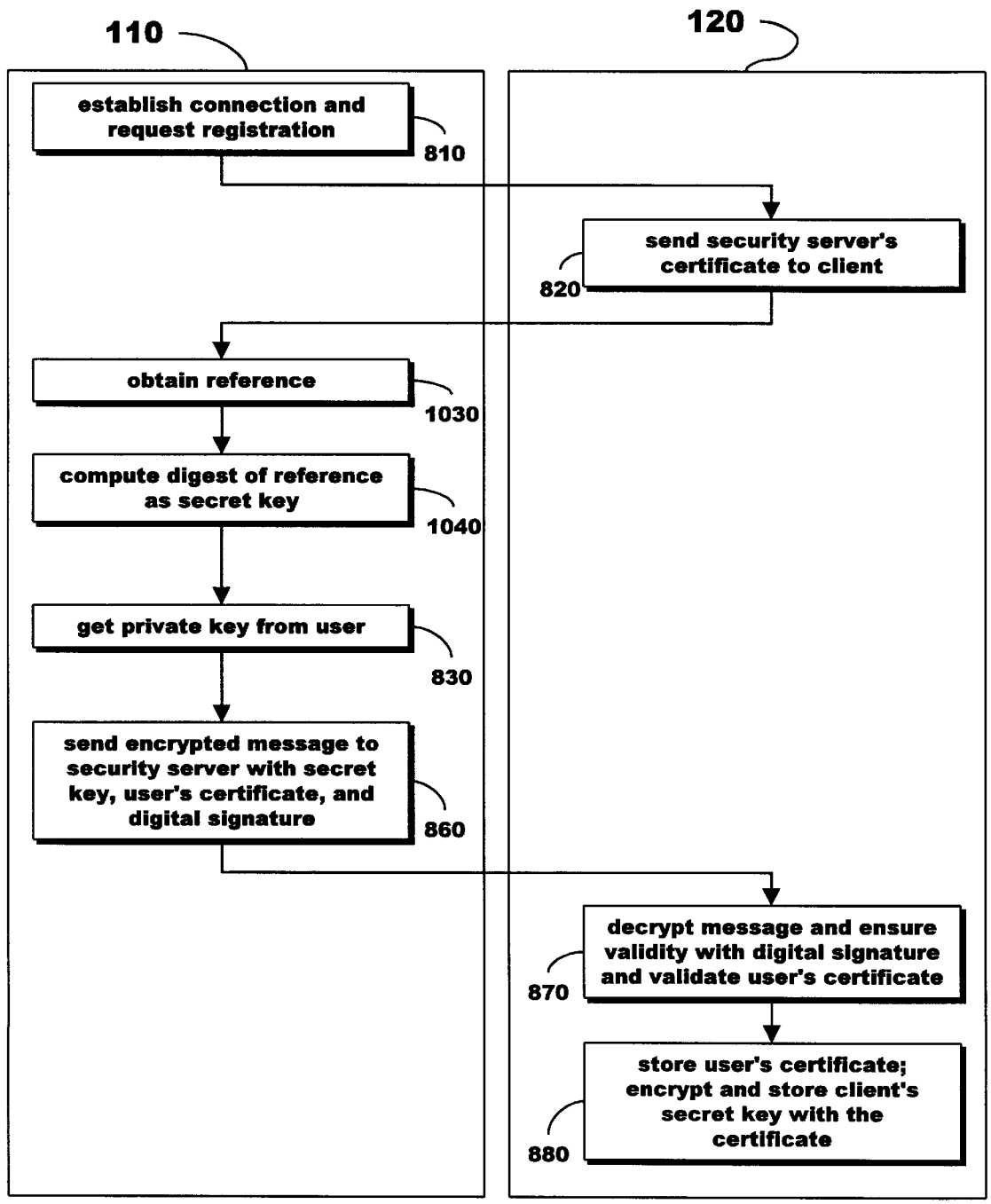
FIG. 10 illustrates a registration procedure in different embodiments of the invention.

The registration procedure will be described with reference to FIG. 10. Communications server 700 is not shown.

In step 810, a user, via client 110, requests a connection with security server 120. A connection is established between client 110 and security server 120.

The security server 120, in step 820, then sends to the client 110 its certificate.

In step 1030, the client reads the magnetic strip on which certain information may be recorded. The contents, or at least some subset of the contents (which from now on will be referred to as the "reference"), are digested in step 1040. The digest computed from the reference is used as the secret key.

In step 830, the user provides his private key to the client. The private key may be entered in any manner, such as manually or with a smart card.

The secret key, in this embodiment, is not stored at the client, and neither is the reference.

In step 860, a message is prepared for sending with a digital signature generated with the user's private key. The message includes the secret key generated in step 1040 and the user's certificate. The message is encrypted with the security server's public key and is sent from client 110 to security server 120.

In step 870, the security server 120 decrypts the message using its own private key and obtains the message having the secret key of the user (generated by the client, i.e., the client secret key) and the certificate of the user, and also obtains the digital signature of the user which is verified. The security server 120 also may validate the user's certificate at this point.

In step 880, the security server encrypts and stores the user's secret key along with the user's certificate for easy retrieval. These may be stored in an authentication table for quick reference.

Again, the registration procedure need be performed only one time, but must precede the first operation requiring the authentication procedure to be performed.

It is to be noted that the contents of the user's magnetic card are never per se transmitted to the security server. The digested contents of the card are sent. An intercepted message therefore does not contain, for example, a user's credit card number or other personal information.

It is to be noted that the user's private key used to prepare the registration will not be required for subsequent authentication operations and therefore the magnetic swipe card or the like will be thereafter sufficient.

Authentication

Figure 11:
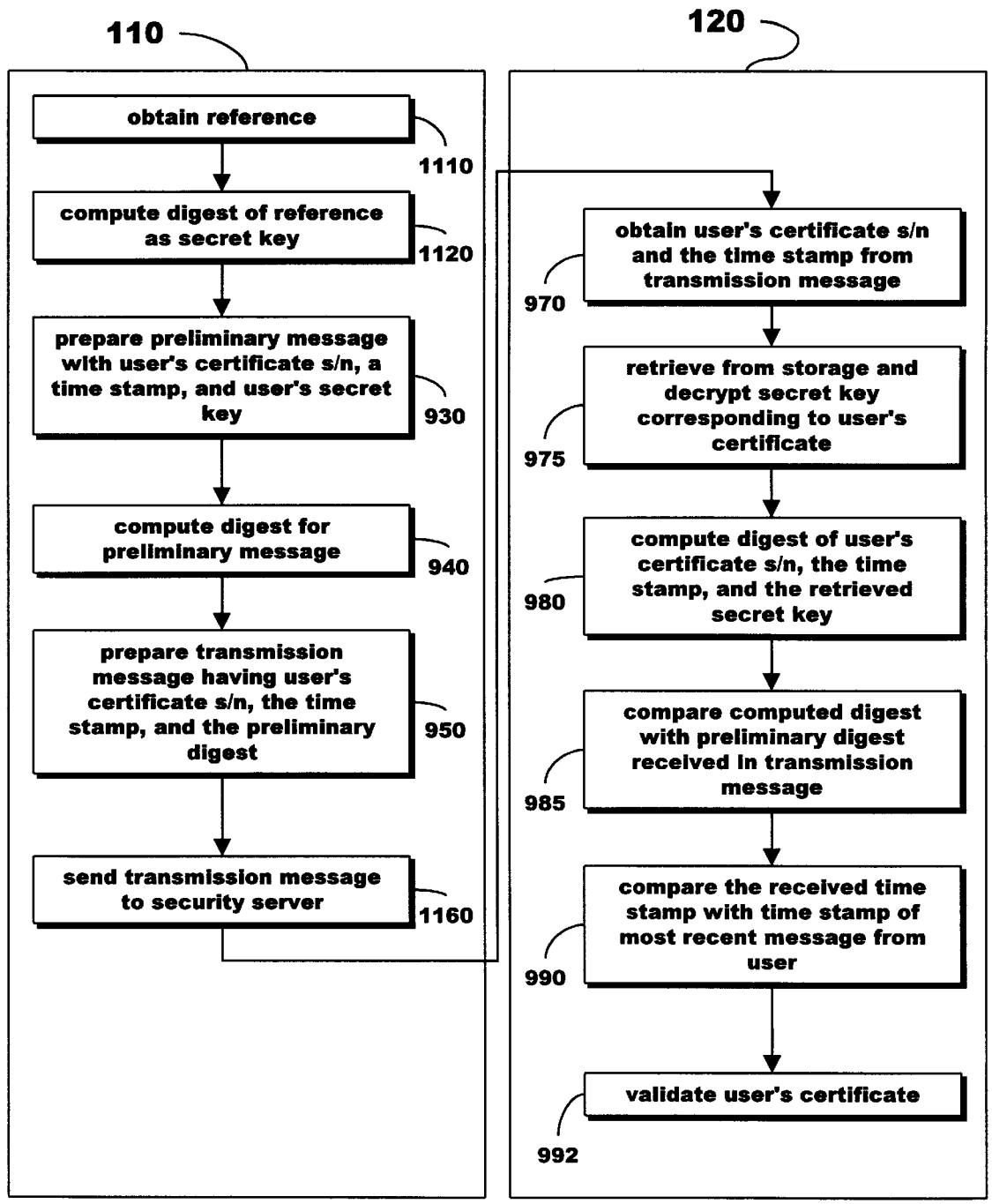
FIG. 11 illustrates an authentication procedure corresponding to the registration procedures of FIG. 10.

With reference to FIG. 11, the user provides his magnetic card, which is read by a client process 110 in step 1110. The contents of the card may be referred to as the reference. The client, which has neither the secret key nor the reference, computes a digest of the reference and uses the digest of the reference as a secret key.

The preliminary message of step 930 includes the user's certificate serial number, a current time stamp, and the user's secret key obtained in step 1110. This preliminary message is never sent.

In step 940, a digest is computed for the preliminary message. Since the digest is computed from the preliminary message, it is hereafter referred to as a preliminary digest.

In step 950, a transmission message is prepared. The transmission message prepared in step 950 includes the user's certificate serial number, the time stamp that was used in making the preliminary digest, and the preliminary digest itself.

In step 1160, the transmission message is sent to the security server. It is worth noting that the transmission message does not contain the user's original information, and does not contain even the secret key.

Steps 970–992 are substantially the same as set out in the embodiment with respect to a remote access environment, as described above.

In step 970, the security server takes the transmission message data that was supplied in the userid and password fields and extracts its constituent parts, namely, the user's certificate serial number, the time stamp determined in step 930, and the preliminary digest computed by the client in step 940. In step 975, the security server uses the user's certificate serial number to retrieve from the authentication table the corresponding certificate and secret key and decrypts the secret key.

In step 980, the security server computes a digest using the user's certificate serial number (provided in the transmission message), the time stamp (also provided in the transmission message), and the secret key (retrieved from the security server's own storage). In step 985, the security server compares the just-computed digest with the reliminary digest that was provided in the transmission message. The two digests can be equal only when the sender of the transmission message possesses a magnetic card with contents that, when digested, match the previously sent user's secret key. Since the user's secret key and reference are not stored at the client, this further implies that the sender possesses the magnetic card that was used at the time of registration.

In step 990, the security server avoids replay attacks by comparing the received time stamp with the time stamp of the most recent message from the user. The step 990 considers as invalid messages that do not have a time stamp that is later than the most recently received message. The storage of the most recent time stamp for each user provides security against replay attacks. As in the previous embodiment, the time stamp may be conveniently stored in the authentication table.

In step 992, the user's certificate may be validated by the security server 120 by performing one or more additional validity checks.

The secret key is passed only once, in encrypted form, from the client to the security server. This occurs during the registration procedure. The secret key is used, however, every time the authentication procedure is carried out. The secret key is a Virtual Private Key (VPK); it is frequently used but never actually passed during authentication.

It is to be noted that the authentication process does not require use of the user's private key.

Embodiment of the Invention Using a Pass phrase

A third presently preferred embodiment involves the use of a passphrase. A pass phrase is something the user memorizes. It is like the "reference" mentioned in the just-described embodiment, but comes forth from the user's memory instead of from a magnetic swipe card or from a biometric device or the like. It is preferable that the passphrase be of sufficient length to foil password breaking schemes that depend on short passwords.

Many aspects of the invention in this third embodiment are substantially similar to corresponding aspects of the magnetic swipe card environment already described. For the sake of simplicity and clarity, such aspects will not again be discussed in detail.

Registration

The registration procedure will be described with reference to FIG. 10. It is to be understood that this third embodiment differs from the second embodiment only in that the reference is provided from a user's memory instead of via some device.

Communications server 700 is not shown.

In step 810, a user, via client 110, requests a connection with security server 120. A connection is established between client 110 and security server 120.

The security server 120, in step 820, then sends to the client 110 its certificate.

In step 1030, the client obtains from the user the pass phrase as the reference. The pass phrase, as the reference, is digested in step 1040. The digest computed from the reference is used as the secret key.

Steps 830, 860, 870, and 880 are performed in a manner identical to the second embodiment.

The registration procedure need be performed only one time, but must precede the first operation requiring the authentication procedure to be performed.

It is to be noted that the user's memorized passphrase never is per se transmitted to the security server. The digested contents are sent. An intercepted message therefore does not contain the pass phrase.

Authentication

With reference to FIG. 11, the user enters the pass phrase as the reference, and this is input by a client process 110 in step 1110. The client, which has neither the secret key nor the reference, computes a digest of the reference and uses the digest of the reference as a secret key (step 1120).

The remaining steps shown in FIG. 11 are the same as set forth in the above-identified second embodiment.

The secret key is passed only once, in encrypted form, from the client to the security server. This occurs during the registration procedure. The secret key is used, however, every time the authentication procedure is carried out. The secret key is a Virtual Private Key (VPK); it is frequently used but never actually passed during authentication.

Generalization to Other Embodiments

Similarly, the use of a VPK could be applied to small magnetic stores permanently affixed to things other than cards, such as merchandise, papers, exhibits, tokens, bracelets, and the like. For the sake of convenience, things other than cards and papers shall be referred to as "articles". Likewise, a VPK could be logically associated with biometric devices such as fingerprint or retinal scanners. For example, a retinal scanner might produce from a scanned retina a certain output that is always the same whenever the retina is scanned. This output could be used as the "reference" and processing would progress as described in the embodiments which have been laid out in detail.

Although the invention has been described in terms of certain steps to be carried out, it is to be understood that the invention resides in a computer system that operates according to the steps outlined above, and also in a program product bearing software for enabling a computer system to operate according to any of the embodiments outlined above.

In the drawing figures, the particular order of steps is not always critical, and certain steps may be performed in parallel with others or in a different order.

In the preferred embodiment, a digest is computed with respect to a secret key, the user's certificate serial number, and a time stamp. The secret key is not the user's private key. It is also possible to operate in accordance with the invention without digesting these precise items. The invention requires the digesting of at least the secret key. If the time stamp is excluded from the digest, the invention still will provide protection but the protection against replay attacks is weakened. Strictly speaking, the digest need not include the user certificate for the invention to operate. It is sufficient that at least the secret key be digested and the digest thus computed be sent.

Likewise, it is not completely necessary that the certificate serial number be sent, but any unique identifier would be sufficient.

Although certain embodiments have been described in detail, the invention is not to be construed as being limited to such embodiments, but in accordance with the appended claims and wherever a VPK can be used to advantage.

I claim:

1. A method of authentication, comprising:
   obtaining a user private key from a user;
   retrieving an encrypted client secret key value associated with said user;
   decrypting said encrypted user secret key value using said user private key to provide a client secret key;
   computing a preliminary digest of:
   a first time stamp,
   a user certificate serial number associated with said user, and
   said client secret key;
   providing an unencrypted message including said first time stamp, said user certificate serial number, and said preliminary digest;

retrieving an encrypted server secret key value associated with said user certificate serial number of said unencrypted message;

decrypting said encrypted server secret key value using a server private key to provide a server secret key;

computing a computed digest of:
   said first time stamp of said unencrypted message,
   said user certificate serial number of said unencrypted message, and
   said server secret key; and determining said present message to be authentic based on a comparison between said preliminary digest of said unencrypted message and said computed digest.

2. The method of authentication as set forth in claim 1, further comprising:
   a registration step which comprises:
      generating said client secret key;
      encrypting said client secret key with a public key of said user to provide said encrypted client secret key value;
      providing a secret key message, encrypted with a server public key, said secret key message including said client secret key, said user certificate serial number, and a user digital signature;
      performing decryption of said encrypted said secret key message using said server private key;
      determining said secret key message to be authentic based on said decryption being successful and based on said digital signature; and
      storing said client secret key as said server secret key in association with said user certificate serial number.

3. A method for server authentication of messages from a user at a client, comprising:
   storing at said client and at said server a secret key associated with said user, said secret key being different from a private key of said user, said secret key at said client defining a client secret key, said secret key at said server defining a server secret key;
   authenticating said user at said client;
   computing at said client a present preliminary digest of a first time stamp, a user certificate serial number associated with said user, and said client secret key;
   providing to said server a present message including said first time stamp, said user certificate serial number, and said present preliminary digest;
   retrieving said server secret key on the basis of said user certificate serial number;
   generating at said server a present computed digest of said first time stamp, said user certificate serial number included in said present message, and server secret key;
   determining said present message to be authentic when said present preliminary digest and said present computed digest are identical.

4. The method for server authentication as set forth in claim 3, wherein said step of storing includes:
   sending from said server a server certificate to said client;
   obtaining from said user said private key of said user;
   generating at said client said secret key;
   sending to said server a secret key message including said secret key, said user certificate serial number, and a digital signature of said user;
   authenticating said secret key message at said server based on said digital signature; and
   storing said secret key as said server secret key.

5. The method for server authentication as set forth in claim 4, further comprising:
   storing said client secret key encrypted with a public key of said user;
   storing said server secret key encrypted with a public key of said server; and
   storing said server secret key in association with said user certificate serial number.

6. The method for server authentication of messages as set forth in claim 3, further comprising:
   computing at said client a subsequent preliminary digest of a second time stamp, said user certificate serial number, and said client secret key;
   providing to said server a subsequent message including said second time stamp, said user certificate serial number, and said subsequent preliminary digest;
   generating at said server a subsequent computed digest of said second time stamp, said user certificate serial number included in said subsequent message, and said server secret key;
   determining said subsequent message to be authentic when said subsequent preliminary digest is identical to said subsequent computed digest and said second time stamp is later than said first time stamp.

7. The method for server authentication as set forth in claim 6, wherein said step of storing includes:
   sending from said server a server certificate to said client;
   obtaining from said user said private key of said user;
   generating at said client said secret key;
   sending to said server a secret key message including said secret key, said user certificate serial number, and a digital signature of said user;
   authenticating said secret key message at said server based on said digital signature; and
   storing said secret key as said server secret key.

8. The method for server authentication as set forth in claim 7, further comprising:
   storing said client secret key encrypted with a public key of said user;
   storing said server secret key encrypted with a public key of said server; and
   storing said server secret key in association with said user certificate serial number.

9. A method for server authentication of messages, comprising:
   storing at said server a plurality of registered secret keys, each associated with a respective registered user;
   receiving a present transmission message;
   obtaining a sending user certificate serial number, a present first stamp, and a received digest from said present transmission message;
   retrieving one of said plurality of registered secret keys based on said sending user certificate serial number;
   generating a computed digest of said sending user certificate serial number, said first time stamp, and said one of said plurality of registered secret keys;
   comparing said computed digest with said received digest; and
   determining said present message to be authentic when said computed digest and said received digest are identical.

10. The method for server authentication as set forth in claim 9, wherein said step of storing includes:

receiving a registration request message from a user;

sending to said user a server certificate;

receiving a secret key message;

decrypting said secret key message using a public key of said user to provide a decrypted secret key message;

obtaining a digital signature and a sent secret key from said decrypted secret key message;

authenticating said secret key message based on said digital signature; and storing at said server said sent secret key as one of said plurality of registered secret keys.

11. The method for server authentication as set forth in claim 10, further comprising:

encrypting said sent secret key with a public key of said server before storing said sent secret key; and storing said sent secret key in association with a certificate of said user.

12. The method for server authentication as set forth in claim 9, further comprising:

receiving a subsequent transmission message;

obtaining said sending user certificate serial number, a second time stamp, and a subsequent received digest from said subsequent transmission message;

generating a subsequent computed digest of said sending user certificate serial number, said second time stamp, and said one of said plurality of registered secret keys;

determining said subsequent message to be authentic when said subsequent received digest is identical to said subsequent computed digest and said second time stamp is later than said first time stamp.

13. The method for server authentication as set forth in claim 12, wherein said step of storing includes:

receiving a registration request message from a user;

sending to said user a server certificate;

receiving a secret key message;

decrypting said secret key message using a public key of said user to provide a decrypted secret key message;

obtaining a digital signature and a sent secret key from said decrypted secret key message;

authenticating said secret key message based on said digital signature; and storing at said server said sent secret key as one of said plurality of registered secret keys.

14. The method for server authentication as set forth in claim 13, further comprising:

encrypting said sent secret key with a public key of said server before storing said sent secret key; and storing said sent secret key in association with a certificate of said user.

15. A method for server authentication of messages from a user at a client, comprising:

storing at said server a server secret key associated with said user, said server secret key being different from a private key of said user;

authenticating said user at said client;

obtaining from said user a reference;

digesting said reference to provide a client secret key;

computing at said client a present preliminary digest of a first time stamp, a user certificate serial number associated with said user, and said client secret key;

providing to said server a present message including said first time stamp, said user certificate serial number, and said present preliminary digest;

retrieving said server secret key on the basis of said user certificate serial number;

generating at said server a present computed digest of said first time stamp, said user certificate serial number included in said present message, and said server secret key;

determining said present message to be authentic when said present preliminary digest and said present computed digest are identical.

16. The method for server authentication as set forth in claim 15, wherein said step of storing includes:

sending from said server a server certificate to said client;

obtaining from said user said private key of said user;

sending to said server a secret key message including said client secret key, said user certificate serial number, and a digital signature of said user;

authenticating said secret key message at said server based on said digital signature; and storing said client secret key as said server secret key.

17. The method for server authentication as set forth in claim 16, further comprising:

storing said server secret key encrypted with a public key of said server; and storing said server secret key in association with said user certificate serial number.

18. The method for server authentication of messages as set forth in claim 15, further comprising:

computing at said client a subsequent preliminary digest of a second time stamp, said user certificate serial number, and said client secret key;

providing to said server a subsequent message including said second time stamp, said user certificate serial number, and said subsequent preliminary digest;

generating at said server a subsequent computed digest of said second time stamp, said user certificate serial number included in said subsequent message, and said server secret key;

determining said subsequent message to be authentic when said subsequent preliminary digest is identical to said subsequent computed digest and said second time stamp is later than said first time stamp.

19. The method for server authentication as set forth in claim 18, wherein said step of storing includes:

sending from said server a server certificate to said client;

obtaining from said user said private key of said user;

sending to said server a secret key message including said client secret key, said user certificate serial number, and a digital signature of said user;

authenticating said secret key message at said server based on said digital signature; and storing said client secret key as said server secret key.

20. The method for server authentication as set forth in claim 19, further comprising:

storing said server secret key encrypted with a public key of said server; and storing said server secret key in association with said user certificate serial number.

21. The method for server authentication as set forth in claim 15, wherein said step of obtaining from said user said reference comprises reading said reference from a magnetic swipe card.

22. The method for server authentication as set forth in claim 15, wherein said step of obtaining from said user said reference comprises reading as said reference an output from a biometric device.

23. The method for server authentication as set forth in claim 15, wherein said step of obtaining from said user said reference comprises obtaining said reference from a magnetic store affixed to an article.

24. The method for server authentication as set forth in claim 15, wherein said step of obtaining from said user said reference comprises obtaining said reference from a magnetic store affixed to paper.

25. A network system for server authentication of messages from a user at a client, comprising:
   a client storing a client secret key associated with said user, and
   a server storing a server secret key identical to said client secret key;
   said client secret key being different from a private key of said user;
   said client including a respective computer system comprising:
      a respective processor, and
      a respective memory including software instructions adapted to enable said respective computer system to perform, under control of said respective processor, the steps of:
         authenticating said user using said private key,
         computing a present preliminary digest of a first time stamp, a user certificate serial number associated with said user, and said client secret key, and
         creating for transmission a present message including said first time stamp, said user certificate serial number, and said present preliminary digest;
   said server including a respective computer system comprising:
      a respective processor, and
      a respective memory including software instructions adapted to enable said respective computer system to perform, under control of said respective processor, the steps of:
         retrieving said server secret key on the basis of said user certificate serial number in said present message,
         generating a present computed digest of said first time stamp, said user certificate serial number included in said present message, and said server secret key, and
         determining said present message to be authentic when said present preliminary digest and said present computed digest are identical.

26. The network system for authentication as set forth in claim 25, wherein:
   said respective memory of said client further includes software instructions adapted to enable said respective client computer system to:
      generate said client secret key, and
      send to said server a secret key message including said secret key, said user certificate serial number, and a digital signature of said user; and
   said respective memory of said server further includes software instructions adapted to enable said respective computer system of said server to:
      authenticate said secret key message based on said digital signature, and
      store said secret key as said server secret key.

27. The network system for authentication as set forth in claim 26, wherein:
   said respective memory of said client further includes software instructions adapted to enable said respective client computer system to store said client secret key encrypted with a public key of said user; and
   said respective memory of said server further includes software instructions adapted to enable said respective computer system of said server to:
      store said server secret key encrypted with a public key of said server, and
      store said server secret key in association with said user certificate serial number.

28. The network system for authentication of messages as set forth in claim 25, wherein:
   said respective memory of said client further includes software instructions adapted to enable said respective client computer system to:
      compute a subsequent preliminary digest of a second time stamp, said user certificate serial number, and said client secret key, and
      provide to said server a subsequent message including said second time stamp, said user certificate serial number, and said subsequent preliminary digest; and
   said respective memory of said server further includes software instructions adapted to enable said respective computer system of said server to:
      generate a subsequent computed digest of said second time stamp, said user certificate serial number included in said subsequent message, and said server secret key, and
      determine said subsequent message to be authentic when said subsequent preliminary digest is identical to said subsequent computed digest and said second time stamp is later than said first time stamp.

29. The network system for authentication as set forth in claim 28, wherein:
   said respective memory of said client further includes software instructions adapted to enable said respective client computer system to:
      generate said secret key, and
      send to said server a secret key message including said secret key, said user certificate serial number, and a digital signature of said user;
   said respective memory of said server further includes software instructions adapted to enable said respective computer system of said server to:
      authenticate said secret key message based on said digital signature, and
      store said secret key as said server secret key.

30. The network system for authentication as set forth in claim 29, wherein:
   said respective memory of said client further includes software instructions adapted to enable said respective client computer system to store said client secret key encrypted with a public key of said user; and
   said respective memory of said server further includes software instructions adapted to enable said respective computer system of said server to:
      store said server secret key encrypted with a public key of said server, and
      store said server secret key in association with said user certificate serial number.

31. A computer system adapted to authenticate messages, comprising:
   a processor, and
   a memory including software instructions adapted to enable the computer system, under control of said processor, to perform the steps of:

storing a plurality of registered secret keys, each associated with a respective registered user;

receiving a present transmission message;

obtaining a sending user certificate serial number, a present first stamp, and a received digest from said present transmission message;

retrieving one of said plurality of registered secret keys based on said sending user certificate serial number;

generating a computed digest of said sending user certificate serial number, said first time stamp, and said one of said plurality of registered secret keys;

comparing said computed digest with said received digest; and determining said present message to be authentic when said computed digest and said received digest are identical.

32. The computer system adapted to authenticate messages, as set forth in claim 31, wherein said memory further includes software instructions adapted to enable the computer system further to perform said step of storing said plurality of registered secret keys by:

receiving a registration request message from a user;

sending to said user a server certificate;

receiving a secret key message;

decrypting said secret key message using a public key of said user to provide a decrypted secret key message;

obtaining a digital signature and a sent secret key from said decrypted secret key message;

authenticating said secret key message based on said digital signature; and storing said sent secret key as one of said plurality of registered secret keys.

33. The computer system adapted to authenticate messages, as set forth in claim 32, wherein said memory further includes software instructions adapted to enable the computer system further to perform the steps of:

encrypting said sent secret key with a public key of said server before storing said sent secret key; and storing said sent secret key in association with a certificate of said user.

34. The computer system adapted to authenticate messages, as set forth in claim 31, wherein said memory further includes software instructions adapted to enable the computer system further to perform the steps of:

receiving a subsequent transmission message;

obtaining said sending user certificate serial number, a second time stamp, and a subsequent received digest from said subsequent transmission message;

generating a subsequent computed digest of said sending user certificate serial number, said second time stamp, and said one of said plurality of registered secret keys;

determining said subsequent message to be authentic when said subsequent received digest is identical to said subsequent computed digest and said second time stamp is later than said first time stamp.

35. The computer system adapted to authenticate messages, as set forth in claim 34, wherein said memory further includes software instructions adapted to enable the computer system further to perform said step of storing said plurality of registered secret keys by:

receiving a registration request message from a user;

sending to said user a server certificate;

receiving a secret key message;

decrypting said secret key message using a public key of said user to provide a decrypted secret key message;

obtaining a digital signature and a sent secret key from said decrypted secret key message;

authenticating said secret key message based on said digital signature; and storing said sent secret key as one of said plurality of registered secret keys.

36. The computer system adapted to authenticate messages, as set forth in claim 35, wherein said memory further includes software instructions adapted to enable the computer system further to perform the steps of:

encrypting said sent secret key with a public key of said server before storing said sent secret key; and storing said sent secret key in association with a certificate of said user.

37. A network system for authentication of messages from a user, comprising:

a client storing a client secret key associated with said user, and a server storing a server secret key identical to said client secret key;

said client secret key being different from a private key of said user;

said client including a respective computer system comprising:

a respective processor, and a respective memory including software instructions adapted to enable said respective computer system to perform, under control of said respective processor, the steps of:

obtaining from said user a reference;

digesting said reference to provide a client secret key;

computing a present preliminary digest of a first time stamp, a user certificate serial number associated with said user, and said client secret key;

providing to said server a present message including said first time stamp, said user certificate serial number, and said present preliminary digest;

said server including a respective computer system comprising:

a respective processor, and a respective memory including software instructions adapted to enable said respective computer system to perform, under control of said respective processor, the steps of:

retrieving said server secret key on the basis of said user certificate serial number;

generating a present computed digest of said first time stamp, said user certificate serial number included in said present message, and said server secret key;

determining said present message to be authentic when said present preliminary digest and said present computed digest are identical.

38. The network system for authentication of messages from a user, as set forth in claim 37, wherein:

said respective memory of said client further includes software instructions adapted to enable said respective client computer system to send to said server a secret key message including said client secret key, said user certificate serial number, and a digital signature of said user;

said respective memory of said server further includes software instructions adapted to enable said respective computer system of said server to:

authenticate said secret key message based on said digital signature; and store said client secret key as said server secret key.

39. The network system for authentication of messages from a user, as set forth in claim 38, wherein said respective memory of said server further includes software instructions adapted to enable said respective computer s system of said server to store said server secret key encrypted with a public key of said server, and to store said server secret key in association with said user certificate serial number.

40. The network system for authentication of messages from a user, as set forth in claim 37, further comprising:

said respective memory of said client further includes software instructions adapted to enable said respective client computer system to compute a subsequent preliminary digest of a second time stamp, said user certificate serial number, and said client secret key, and to provide to said server a subsequent message including said second time stamp, said user certificate serial number, and said subsequent preliminary digest;

said respective memory of said server further includes software instructions adapted to enable said respective computer system of said server to:

generate a subsequent computed digest of said second time stamp, said user certificate serial number included in said subsequent message, and said server secret key;

determine said subsequent message to be authentic when said subsequent preliminary digest is identical to said subsequent computed digest and said second time stamp is later than said first time stamp.

41. The network system for authentication of messages from a user, as set forth in claim 40, wherein:

said respective memory of said client further includes software instructions adapted to enable said respective client computer system to send to said server a secret key message including said client secret key, said user certificate serial number, and a digital signature of said user;

said respective memory of said server further includes software instructions adapted to enable said respective computer system of said server to:

authenticate said secret key message based on said digital signature; and store said client secret key as said server secret key.

42. The network system for authentication of messages from a user, as set forth in claim 41, wherein said respective memory of said server further includes software instructions adapted to enable said respective computer system of said server to store said server secret key encrypted with a public key of said server, and to store said server secret key in association with said user certificate serial number.

43. The network system for authentication of messages from a user, as set forth in claim 37, further comprising a magnetic swipe card apparatus providing said reference to said computer system of said client.

44. The network system for authentication of messages from a user, as set forth in claim 37, further comprising a biometric device providing said reference to said computer system of said client.

45. The network system for authentication of messages from a user, as set forth in claim 37, further comprising a magnetic store affixed to an article and providing said reference to said computer system of said client.

46. The network system for authentication of messages from a user, as set forth in claim 37, further comprising a magnetic store affixed to paper and providing said reference to said computer system of said client.

47. A computer program product for enabling a computer to authenticate messages, comprising:

software instructions for enabling the computer to perform predetermined operations, and a computer readable medium bearing the software instructions;

the predetermined operations including the steps of:

storing a plurality of registered secret keys, each associated with a respective registered user;

receiving a present transmission message;

obtaining a sending user certificate serial number, a present first stamp, and a received digest from said present transmission message;

retrieving one of said plurality of registered secret keys based on said sending user certificate serial number;

generating a computed digest of said sending user certificate serial number, said first time stamp, and said one of said plurality of registered secret keys;

comparing said computed digest with said received digest; and determining said present message to be authentic when said computed digest and said received digest are identical.

48. The computer program product for enabling a computer to authenticate messages, as set forth in claim 47, wherein:

said software instructions further enable the computer to perform said predetermined operations including:

receiving a registration request message from a user;

sending to said user a server certificate;

receiving a secret key message;

decrypting said secret key message using a public key of said user to provide a decrypted secret key message;

obtaining a digital signature and a sent secret key from said decrypted secret key message;

authenticating said secret key message based on said digital signature; and storing said sent secret key as one of said plurality of registered secret keys.

49. The computer program product for enabling a computer to authenticate messages, as set forth in claim 48, wherein:

said software instructions further enable the computer to perform said predetermined operations including:

encrypting said sent secret key with a public key of said server before storing said sent secret key; and storing said sent secret key in association with a certificate of said user.

50. The computer program product for enabling a computer to authenticate messages, as set forth in claim 47, wherein:

said software instructions further enable the computer to perform said predetermined operations including:

receiving a subsequent transmission message;

obtaining said sending user certificate serial number, a second time stamp, and a subsequent received digest from said subsequent transmission message;

generating a subsequent computed digest of said sending user certificate serial number, said second time stamp, and said one of said plurality of registered secret keys;

determining said subsequent message to be authentic when said subsequent received digest is identical to said subsequent computed digest and said second time stamp is later than said first time stamp.

51. The computer program product for enabling a computer to authenticate messages, as set forth in claim 50, wherein:

said software instructions further enable the computer to perform said predetermined operations so that said step of storing said plurality of registered secret keys includes:
receiving a registration request message from a user;
sending to said user a server certificate;
receiving a secret key message;
decrypting said secret key message using a public key of said user to provide a decrypted secret key message;
obtaining a digital signature and a sent secret key from said decrypted secret key message;
authenticating said secret key message based on said digital signature; and
storing said sent secret key as one of said plurality of registered secret keys.

52. The computer program product for enabling a computer to authenticate messages, as set forth in claim 51, wherein:

said software instructions further enable the computer to perform said predetermined operations including:
encrypting said sent secret key with a public key of said server before storing said sent secret key; and
storing said sent secret key in association with a certificate of said user.

53. The method for server authentication as set forth in claim 15, wherein said step of obtaining from said user said reference comprises said user entering a pass phrase as said reference.

54. The network system for authentication of messages from a user, as set forth in claim 37, further comprising said user entering a pass phrase as said reference.

55. The method for authentication as set forth in claim 1, further comprising validating a certificate of said user.

56. The method for server authentication as set forth in claim 3, further comprising validating a certificate of said user.

57. The method for server authentication as set forth in claim 9, further comprising validating a certificate of said user.

58. The method for server authentication as set forth in claim 15, further comprising validating a certificate of said user.

59. The network system for authentication as set forth in claim 25, wherein said respective memory of said server further includes software instructions adapted to enable said respective computer system of said server to validate a certificate of said user.

60. The computer system adapted to authenticate messages, as set forth in claim 31, wherein said memory further includes software instructions adapted to enable the computer system further to perform a step of validating s a certificate of said user.

61. The network system for authentication of messages from a user, as set forth in claim 37, wherein said respective memory of said server further includes software instructions adapted to enable said respective computer system of said server to validate a certificate of said user.

62. The computer program product for enabling a computer to authenticate messages, as set forth in claim 47, wherein said software instructions further enable the computer to perform so that said predetermined operations include validating a certificate of said user.

* * * * *